United States Patent [19]
Li et al.

[11] Patent Number: 5,754,122
[45] Date of Patent: May 19, 1998

[54] SYSTEM AND METHOD FOR MONITORING STRUCTURES

[75] Inventors: Weiping Li; Qinghong Cao, both of Bethlehem, Pa.

[73] Assignee: Competitive Technologies, Inc., Westport, Conn.

[21] Appl. No.: 546,352

[22] Filed: Oct. 20, 1995

Related U.S. Application Data

[63] Continuation of Ser. No. 94,388, Jul. 19, 1993, abandoned.

[51] Int. Cl.$^6$ .............................. G08C 13/02; G08C 17/02
[52] U.S. Cl. ............................. 340/870.11; 340/870.03
[58] Field of Search .................... 340/870.11, 870.01, 340/870.03, 870.14; G08C 13/02, 17/02

[56] References Cited

U.S. PATENT DOCUMENTS

| | | | |
|---|---|---|---|
| 3,609,729 | 9/1971 | Anderson | 340/203 |
| 4,477,725 | 10/1984 | Asawa et al. | 73/800 |
| 4,546,649 | 10/1985 | Kantor | 340/870.11 |
| 4,566,339 | 1/1986 | Davidson et al. | 340/870.38 |
| 4,680,585 | 7/1987 | Fasching | 340/870.13 |
| 4,749,992 | 6/1988 | Fitzmeyer et al. | 340/870.02 |
| 4,803,886 | 2/1989 | May et al. | 340/870.38 |
| 4,831,558 | 5/1989 | Shoup et al. | 364/550 |
| 4,940,976 | 7/1990 | Gastouniotis et al. | 340/870.03 |
| 5,029,101 | 7/1991 | Fernandez | 340/870.07 |
| 5,086,651 | 2/1992 | Westermo et al. | 340/665 |
| 5,194,860 | 3/1993 | Jones et al. | 340/870.03 |

OTHER PUBLICATIONS

S.D. Downing and D.F. Socie, *Simple Rainflow Counting Algorithms*, Int. J. Fatigue, Jan. 1982, pp. 31–40.

*Primary Examiner*—Thomas L. Stoll
*Attorney, Agent, or Firm*—Martin M. Novack

[57] ABSTRACT

A system is disclosed for monitoring strain on a structure, such as a bridge. A plurality of battery powered wireless monitoring units are adapted for attachment to the structure, each or the units including: a sensing transducer for producing signals representative of strain, processing circuitry for processing strain-representative signals, the processing circuitry including a rain flow counter, storage for storing, as processed signals, accumulated rain flow counts of predetermined magnitudes, and a transmitter for wireless transmission of the processed signals to a receiver.

9 Claims, 16 Drawing Sheets

| STRAIN | COUNTS |
|---|---|
| 10 | |
| 9 | |
| 8 | 1 |
| 7 | |
| 6 | 1 |
| 5 | |
| 4 | |
| 3 | |
| 2 | |
| 1 | 2 |

FIG. 6

SYSTEM AND METHOD FOR MONITORING STRUCTURES

This is a continuation of U.S. application Ser. No. 08/094,388, filed Jul. 19, 1993 abandoned.

This invention was made with government support under Contract ECD-9046524 of National Science Foundation. The government has certain rights in this invention.

FIELD OF THE INVENTION

This invention relates to inspection of structures and, more particularly, to the monitoring of structures such as bridges, railways, or buildings over substantial periods of time to determine parameters such as strain, stress, fatigue damage, and remaining fatigue life.

BACKGROUND OF THE INVENTION

The safety of various types of large structures, especially bridges, is a matter of growing concern. Many of these structures were built tens of years ago, and even occasional structural failures are unacceptable because of the potential toll in human life. Civil engineers typically employ cumulative fatigue damage analysis procedures to estimate fatigue life of large structures. In general, a structure is considered safe during its fatigue life. When its fatigue life ends, the structure requires special examination. The fatigue life of sample specimens can be determined for constant amplitude tests. However, structures seldom, if ever, experience constant amplitude loading. Therefore, approaches have been developed which use a cycle counting scheme to reduce a complex irregular loading history into a series of constant amplitude events. Among the most accurate fatigue life estimates are those obtained using an analysis based on the strain at the most highly stressed/strained locations, and a cycle counting technique known as "rain flow counting" has been used in obtaining these estimates.

In a typical procedure for testing large structures, civil engineers load a truck or van with equipment and drive to the site of the structure, such as a bridge. Sensing transducers, for example strain gauges, are attached at appropriate locations on the bridge and connected to a recorder, such as a magnetic tape recorder, for recording of the signals from the transducers. The procedure is typically performed over a period of several days. The data obtained can then be processed to determine remaining fatigue life by using, for example, a rain flow counting technique. Although it is believed that data collected over a much longer period of time (for example, of the order of one year) would provide more accurate results, in most cases the cost would be too high.

It is among the objects of the invention to improve convenience and efficiency in the collection of strain data and other data from large structures, and to improve the accuracy of fatigue life computations.

SUMMARY OF THE INVENTION

The present invention addresses limitations of prior art approaches by providing monitoring units having special capabilities and which can be used to monitor strain or other parameters on a structure over relatively long periods of time without the need for expensive field personnel and equipment at the site of the structure being monitored. The monitoring units are provided with their own power, typically a battery, and include a processing capability that requires relatively little power, while highly useful information can be accumulated at the monitoring units and transmitted, by wireless communication, only occasionally to conserve power. In an embodiment hereof, a local communications subsystem, at or near the site, permits reception of relatively low power signals transmitted by the monitoring units, and the local communications subsystem can re-transmit the information to a central processing facility where relatively complex computations can be made to determine, for example, fatigue damage to the structure.

In accordance with an embodiment of the invention, a system is set forth for monitoring strain or other parameters on a structure, such as a bridge. A plurality of monitoring units are adapted for attachment to the structure. Each of the monitoring units includes a sensing transducer, such as a strain gauge, for producing signals representative of a measured parameter, processing circuitry for processing the parameter-representative signals to produce processed signals, means for storing the processed signals, and means for transmitting the processed signals. Receiving means are provided for receiving the transmitted processed signals.

In a preferred embodiment of the invention, each of the monitoring units comprises a semiconductor chip that contains the processing circuitry, the storing means, and the transmitting means.

In accordance with an embodiment of the method of the invention, there is provided a technique for monitoring a parameter of a structure over a time period of at least a plurality of months, comprising the following steps: attaching a plurality of monitoring units to the structure, each of said monitoring units operating to measure a physical parameter of the structure and to accumulate values dependent on parameter measurements over a period of time of at least a plurality of months; transmitting the stored accumulated values from the monitoring units; and receiving the transmitted accumulated values from said plurality of monitoring units.

Further features and advantages of the invention will become more readily apparent from the following detailed description when taken in conjunction with the accompanying drawings.

BRIEF DESCRIPTION OF THE DRAWINGS

FIG. 6 is a table of rain flow counts for the example of FIG. 5.

DETAILED DESCRIPTION

Figure 1:
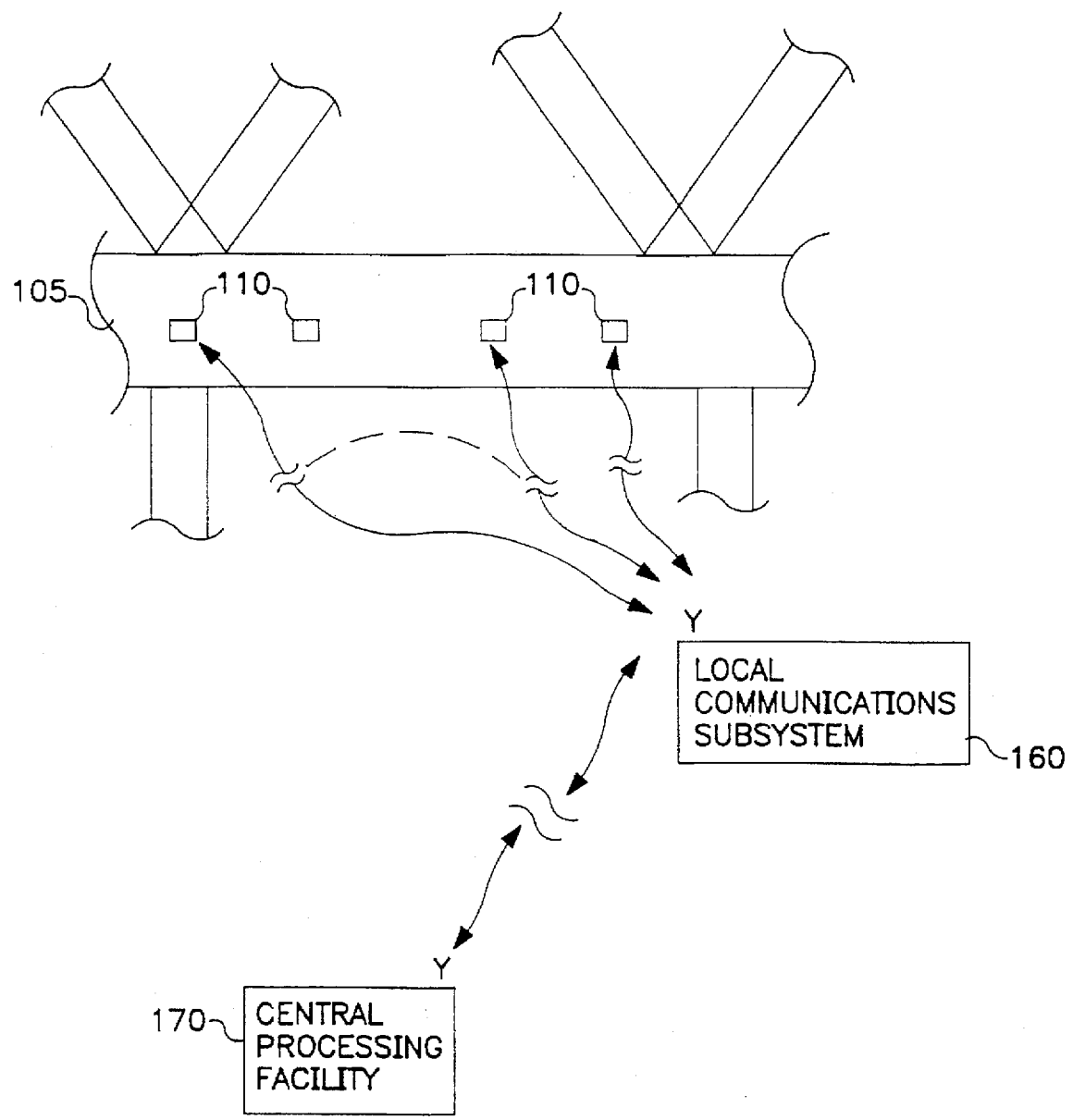
FIG. 1 is a block diagram, partially in schematic form, of a system in accordance with an embodiment of the invention, and which can be used to practice the method of the invention.

Referring to FIG. 1, there is shown a diagram of a system in accordance with an embodiment of the invention for monitoring a structure such as a bridge 105 to obtain information relating to fatigue of the structure. A plurality of monitoring units 150 are attached to the bridge, the diagram of FIG. 1 illustrating several such monitoring units. In the present embodiment, each of the monitoring units performs a number of functions, including sensing of a physical parameter of the bridge (such as measurement of strain), processing the measurements to obtain processed values, storing the processed values, and transmitting the processed values. In the present embodiment, each of the monitoring units includes a power source such as battery, and is capable of wireless transmission to a receiving location at which the transmitted information can be either further processed or re-transmitted to a central processing location. In this embodiment, a local communications subsystem 160 is located at or near the site of the bridge (preferably within one mile of the bridge) and the local communications subsystem 160 can communicate by any suitable communications link (wire or wireless), with a central computing subsystem 170 at which any desired type of fatigue processing (e.g. to determine fatigue or remaining fatigue life) can be implemented. In the present embodiment, the monitoring units 110, the local communications subsystem 160, and the central processing subsystem 170 all include transceivers for two-way communication.

Figure 2:
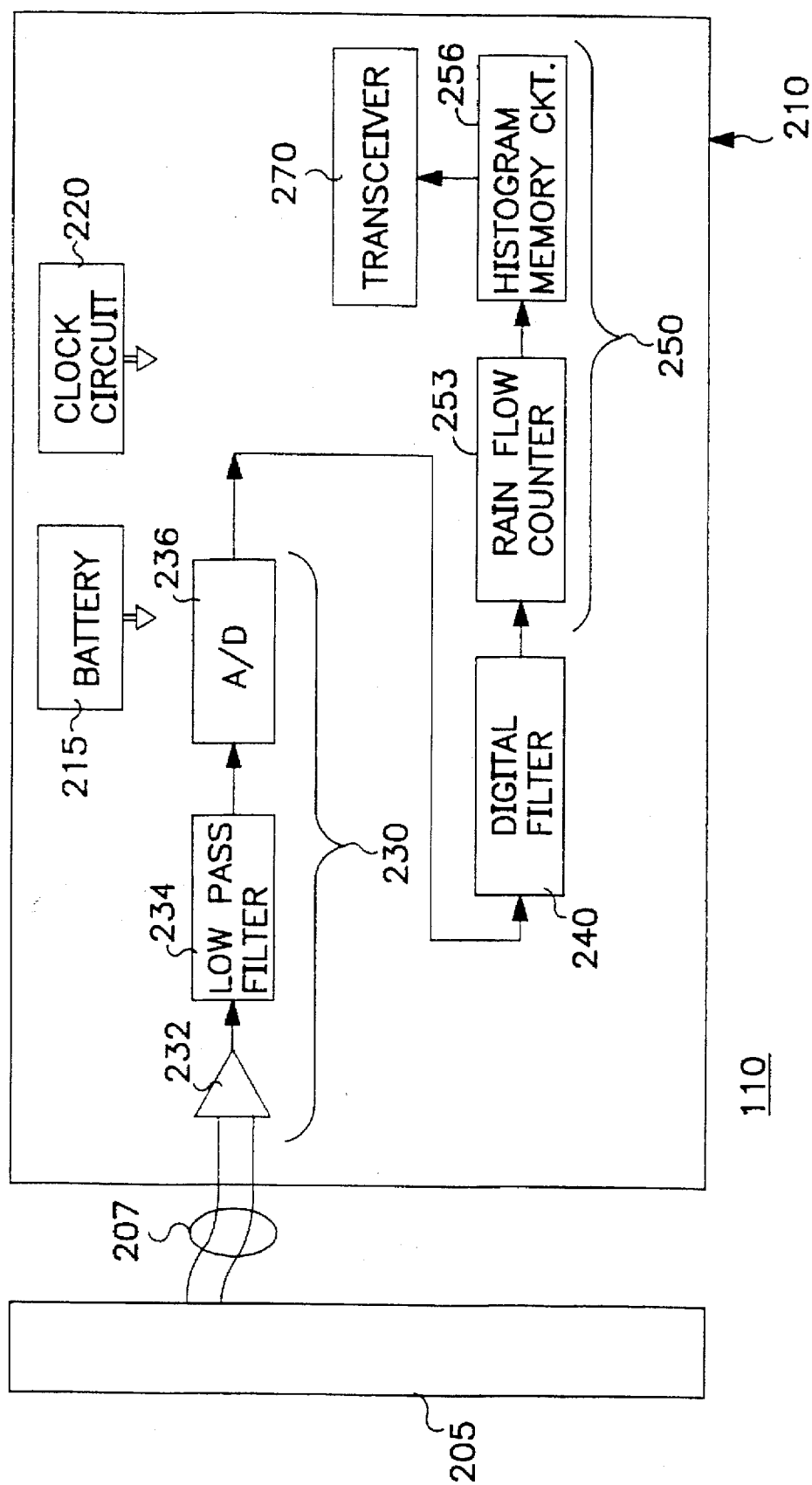
FIG. 2 is a block diagram of a monitoring unit of the FIG. 1 embodiment.

Referring to FIG. 2, there is shown a block diagram of one of the monitoring units 110. In the embodiment hereof, the monitoring unit includes a strain gauge 205, which can be secured by any suitable means to the structure being monitored, for example by using a bonding agent. The remainder of the monitoring unit can be in the form of a VLSI chip 210, a block diagram of the circuitry of the chip being illustrated in FIG. 2. The chip 210 includes a battery 215 and a clock 220, the outputs of which are available to the other components of the chip. The chip, which can have a size of the order of a penny, is coupled with the strain gauge 205 by leads 207, and the chip can be bonded to the structure 110 near its associated strain gage.

The output of the strain gauge 205 is coupled with signal conditioning circuitry 230 which includes a preamplifier 231, a low-pass filter 234, and an analog-to-digital converter 236. The output of circuitry 230 is coupled to a digital filter 240 that is employed to reduce noise in the digitized signal, and the output of digital filter is a digital signal (for example, of 12 bits) that represents strain as a function of time. This signal is received by a fatigue processor circuit 250 which includes a rain flow counting circuit 253 and a histogram memory circuit 256. The output of the histogram memory is coupled to a transceiver 270 which, in the present embodiment, is a radio modem.

Before proceeding further with the description, a type of fatigue determination processing that can be implemented using the described system will be summarized.

Figure 3:
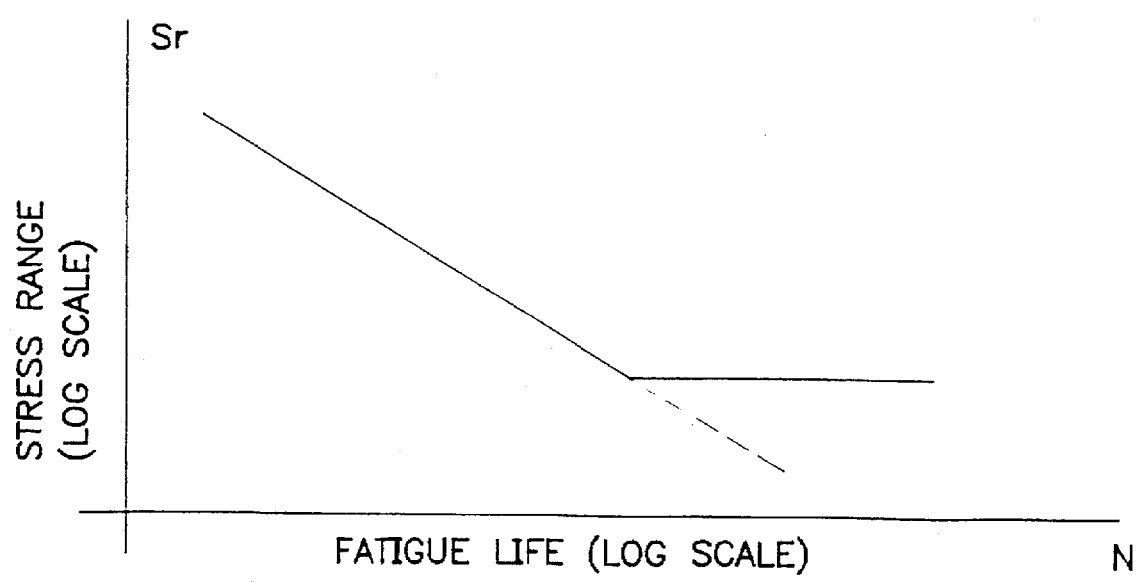
FIG. 3 shows a typical graph of stress range versus number of cycles in the fatigue life.

The principle parameters controlling the fatigue life of a structure such as a bridge are generally understood to include the nature of the structural detail, the stress range experienced by the detail, and the volume and variation of live load traffic on the bridge. Depending on the nature and fabrication of the detail, its fatigue characteristics can be conventionally represented by an $S_r$ versus N curve of the appropriate category as shown in FIG. 3, where $S_r$ is stress range (log scale) and N is the number of cycles in the fatigue life (log scale). Although the $S_r$ vs. N curves are generally referenced to constant amplitude stress cycles, the stress cycles experienced by actual structural details of the bridge vary over a considerable range on account of the variability of truck (or other vehicle) weights, truck configurations, and location of trucks traversing the bridge. A method was needed to assess fatigue damage resulting from a variable stress range spectrum. One such method that was developed uses an equivalent constant amplitude stress range, which causes the same damage and fatigue life as the actual variable stress range spectrum. Traffic volume information can be used to establish the number of stress cycles to convert the fatigue life into a length of time. In essence, the described type of fatigue evaluation of a bridge structure involves the establishment of the fatigue category of the critical detail, the estimation of an equivalent stress range, the estimation of the number of stress cycles experienced by the structural detail and, finally, the estimation of the remaining fatigue life in terms of time units. When an equivalent stress range is obtained from a histogram, the total number of cycles for such equivalent stress range can be determined from the $S_R$ vs. N curve. The number of cycles to date, $N_p$, can be derived from the historical traffic information, if available, or can be estimated. The degree of accumulated fatigue damage to date can then be estimated by comparing the cycles to date, $N_p$, with the total fatigue life $N_r$. The difference between these two values is the remaining fatigue life, $N_r$, that is:

$$N_r = N_f - N_p$$

Figure 4:
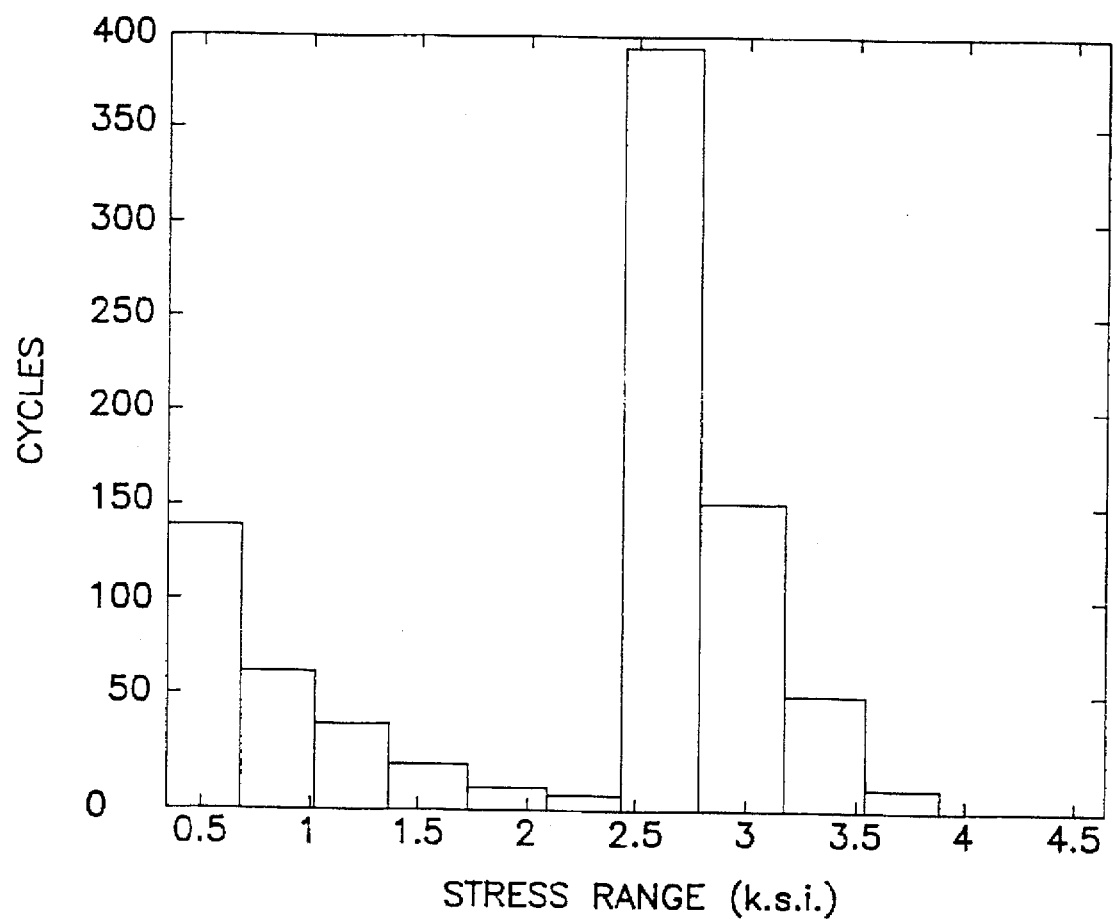
FIG. 4 illustrates an example of a measured stress range histogram.

One can then convert N into a length of time during which the structure will perform safely. As $N_p$ approaches or passes $N_r$, the structure may be entering a dangerous period, and examination and/or repair should be carried out. In the processing to obtain equivalent stress range, the strain-time record over a period is first reduced to a stress range histogram which represents the frequency of occurrence of stress cycles with various particular range magnitudes. Several methods can be used to count the number of cycles, perhaps the most common method selected by civil engineers today being rain flow counting, which is employed in the illustrated embodiment hereof. FIG. 4 illustrates an example of a measured stress-range histogram in which the ordinates show the fraction of stress cycles having range magnitudes within each finite interval. The equivalent constant amplitude stress range can be conventionally determined by invoking Miner's rule, which stipulates linear accumulation of fatigue damage, or $$\Sigma n_i / N_i = 1$$

where $n_i$ is the number of stress cycles with range magnitude $S_{ri}$, and $N_i$ is the fatigue life corresponding to constant stress range $S_{ri}$ as determined from the appropriate $S_r$ vs. N curve. Since the typical $S_r$ vs. N curve, for steel and concrete alike, has a gradient of $-\frac{1}{3}$, the equivalent constant amplitude stress range $S_{re}$ based on Miner's rule is the "root-mean-cube" value of the weighted sum of variable stress ranges cubed, that is $$S_{re} = (\Sigma \gamma_i S_{ri}^3)^{1/3}$$

where, $\gamma_i$ is fraction of occurrence of stress range $S_{ri}$, or $n_i / \Sigma n_i$. It can be noted that because of the typically skewed distribution of the stress range histogram (e.g. FIG. 4), the equivalent stress range $S_{re}$ will typically be significantly lower than the maximum stress range $S_{r,max}$.

Figure 5:
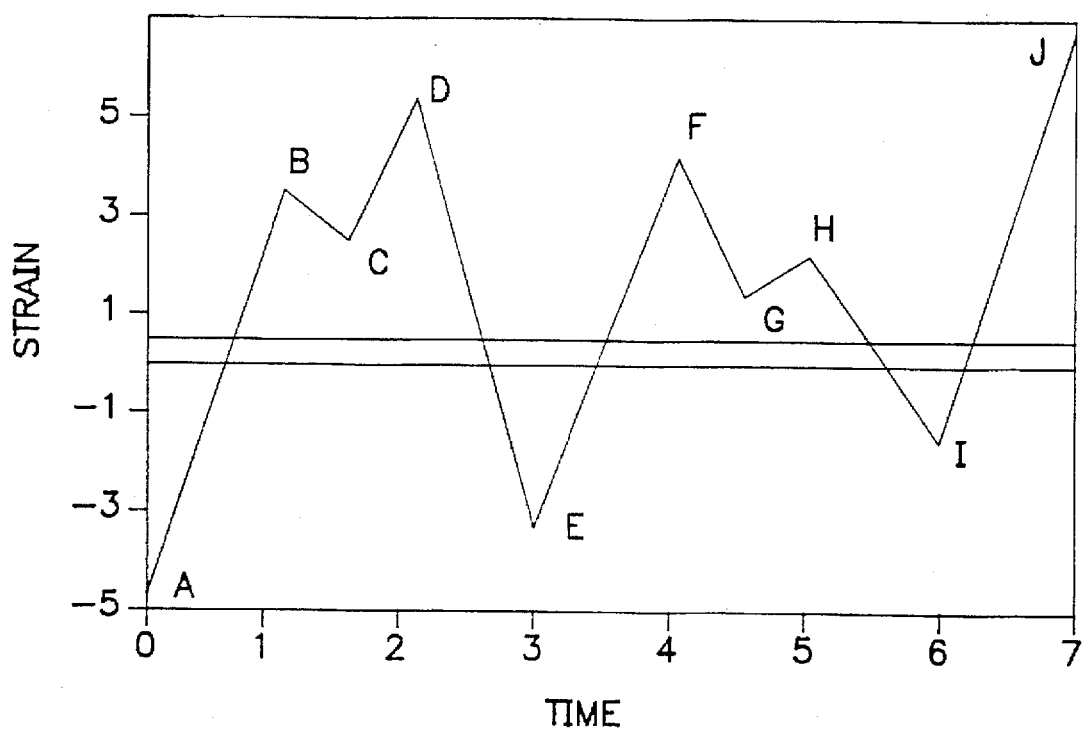
FIG. 5 shows an example of a strain versus time record of strain peaks.

Rain flow counting techniques are well known in the art of fatigue damage analysis. The technique, which considers strain cycles as closed stress/strain hysteresis loops, is useful in reducing a complex irregular loading history into a series of constant amplitude events (see, for example, Downing et al., Simple Rainflow Counting Algorithms, Int. J. Fatigue, January, 1982). There are various ways in which the counting procedure can be visualized. In FIG. 5 a strain vs. time record of strain peaks is presented with the time axis descending vertically. In this example, time is in seconds. In the illustrated graph, negative normalized strain values represent straining in tension, and positive normalized strain values represent straining in compression. The graph can be visualized as a series of pagoda roofs, with rain dripping down on both the left and right surfaces. For example, consider rain dripping down the right side of the graph. At the point B, the rain will drip down and encounter the surface CD. When the rain drips down from the point D, the next surface it hits will be IJ. Rain dripping down from point F, will also encounter the surface IJ. It is when the dripping rain encounters a surface that one or more counts are made. Each count is a measure of the magnitude of a strain differential. Another way to visualize the counting procedure is to consider that a count will be made when the latest peak maximum (i.e., positive-going peak) exceeds a previous peak maximum, or when the latest peak minimum (i.e., negative-going peak) exceeds a previous peak minimum. When a count is made, the peaks whose difference is counted are discarded. The table in FIG. 6 to the right of FIG. 5, shows the counts that result from the strain peaks in the example of FIG. 5; namely two counts of 1, one count of 6, and one count of 8. FIGS. 7–10 illustrate how the counts are determined.

Figure 6:
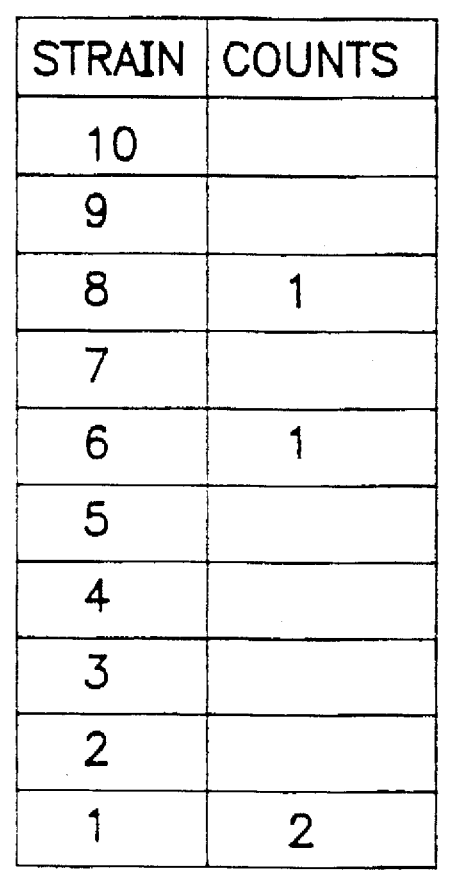
Figure 7:
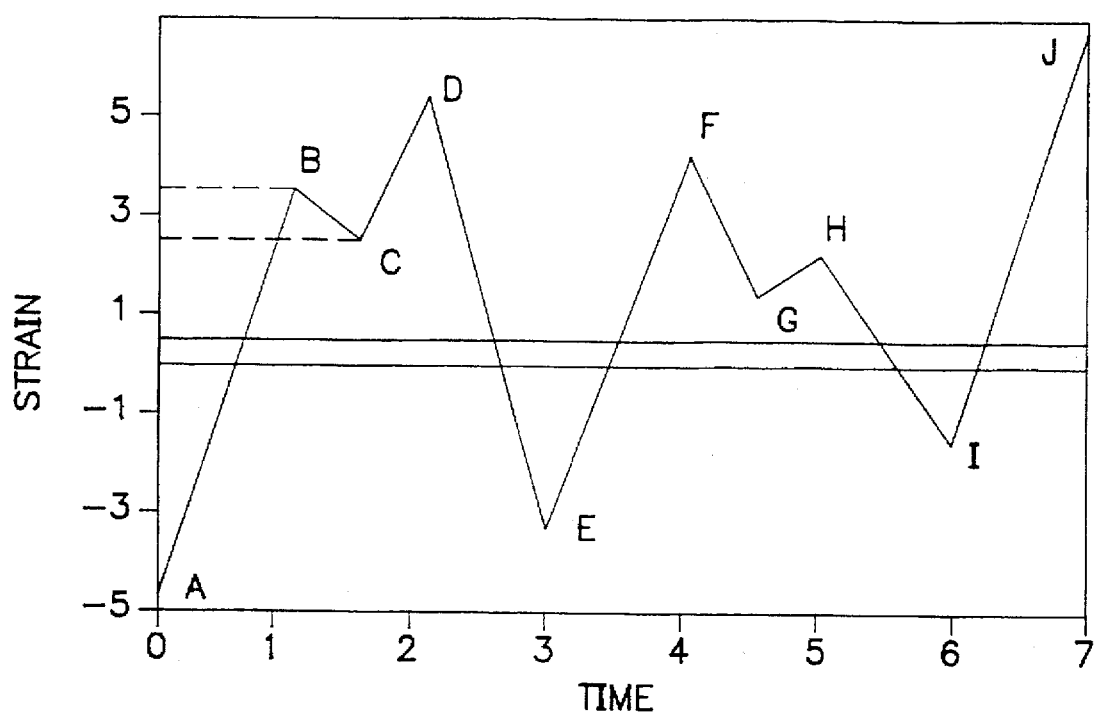
FIGS. 7–10 illustrate how rain flow counts are obtained for the example of FIG. 5.
Figure 8:
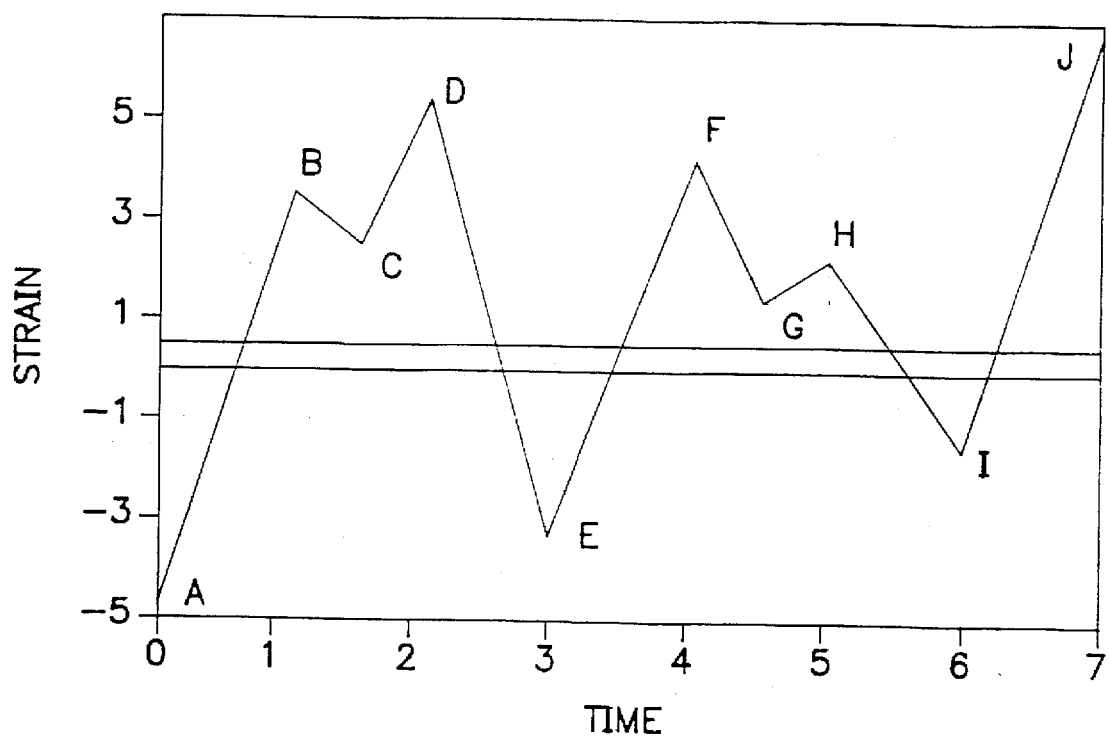
Figure 9:
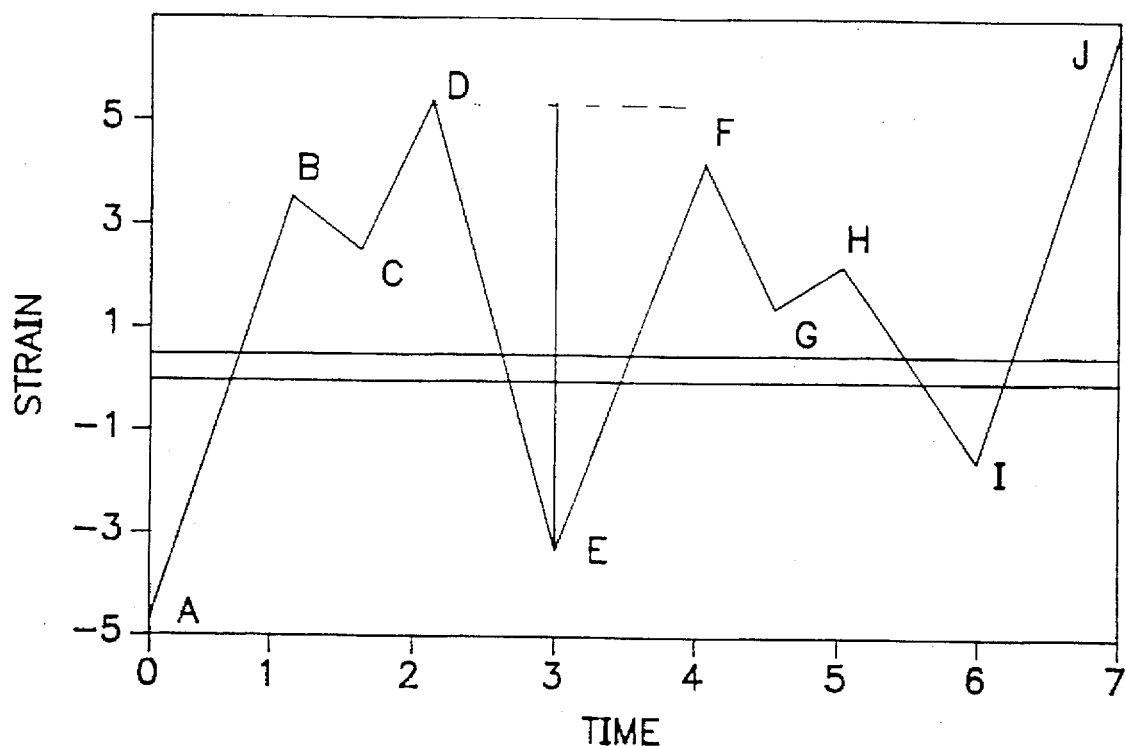
Figure 10:
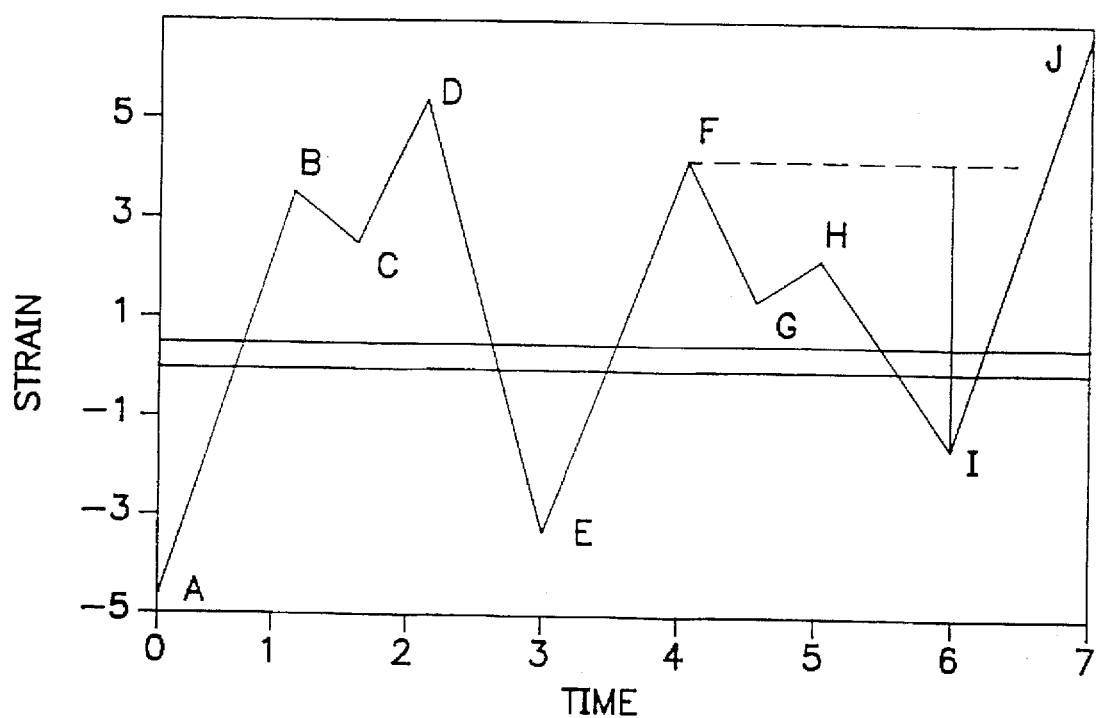

The first count is made when the peak D is found to exceed the previous maximum (positive-going) peak, B. The count will have a strain value (magnitude) of 1, which is the difference in amplitude between peaks B and C, as illustrated in FIG. 7. The peaks B and C are then discarded. The succeeding minimum (negative-going) peaks E and G, and the succeeding maximum (positive-going) peaks F and H do not exceed previous peaks, so no counts are made as these peaks are encountered (the peaks being stored for subsequent processing, as will be subsequently described). The next peak to exceed a previous peak of the same sense is the peak at I, which exceeds the minimum (negative-going) peak at G. This results in a count having a strain value (magnitude) of 1, which is the difference in amplitude between peaks G and H, as illustrated in FIG. 8. The peaks G and H are then discarded. [This leaves peaks A, D, E, F, and I, in this example.] The next peak, J, is a maximum (positive-going) peak which exceeds the remaining positive-going peaks D and F. Two counts result; namely, a count having a strain value (magnitude) of 8, which is the difference in amplitude between the peaks D and E (see FIG. 9), and a count having a strain value (magnitude) of 6, which is the difference in amplitude between the peaks F and I (see FIG. 10). The peaks D, E, F, and I are then discarded. Thus, it is seen how the counts in the table of FIG. 6 are obtained using rain flow counting in the example of FIG. 5. In the example set forth, only the peaks A and J will remain. When a memory holding a predetermined number of peaks (for example 16 peaks or 32 peaks) becomes full, counts are generated from the peaks, and they are removed from the memory.

Figure 11:
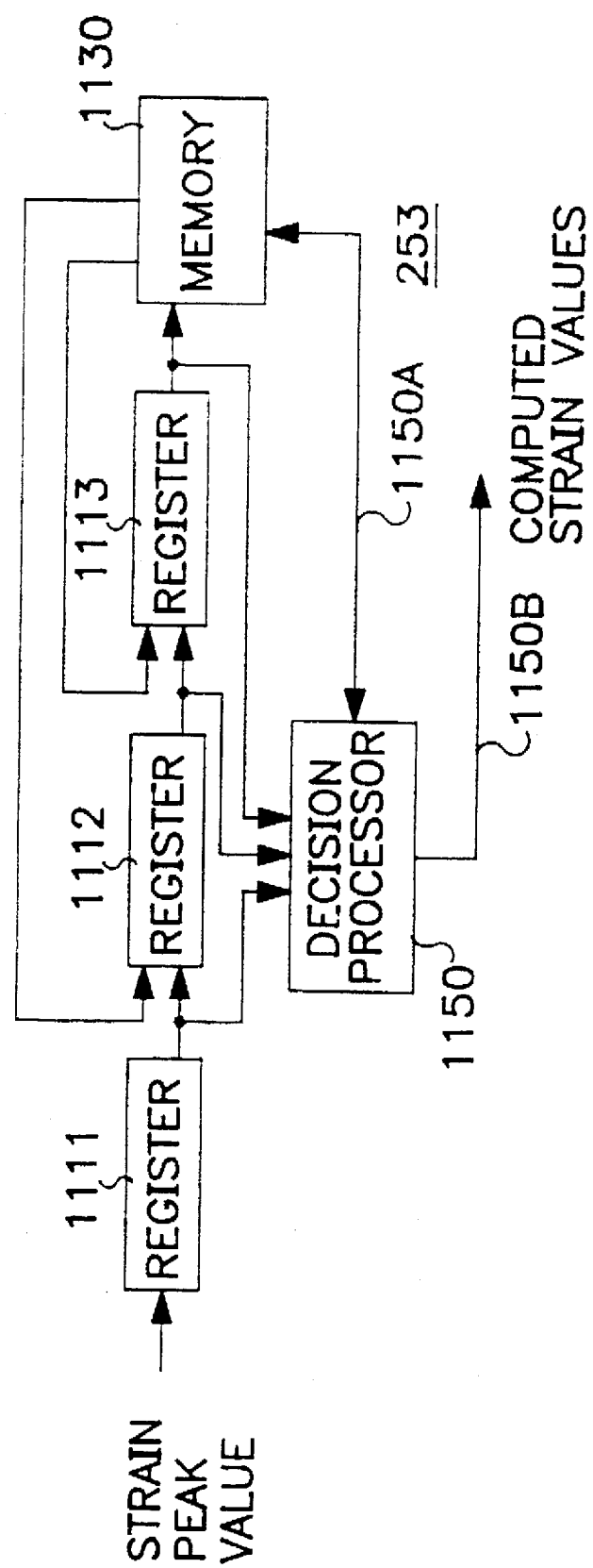
FIG. 11 is a block diagram of a rain flow count circuit in accordance with an embodiment of the invention.

FIG. 11 shows a block diagram of the rain flow count circuit 253 of FIG. 2. The signal representative of strain peak value (for example, a 13 bit signal, with 12 bits representing magnitude and 1 bit representing polarity) is received by a series arrangement of three registers 1111, 1112, and 1113, which will accordingly hold the last three peaks (unless loaded with other peaks, as will be described). The output of register 1113 is coupled with a memory 1130. The registers 1112 and 1113 can also be loaded from the memory 1130. The outputs of the registers 1111, 1112, and 1113 are coupled to a decision processor 1150 which, in the illustrated embodiment, is a microprocessor, but may also be suitable logic circuitry. The processor 1150 communicates with the memory 1130, as indicated by the conductor 1150A. The computed counts (strain values) are output from the decision processor on the line 1150B, which is coupled to the histogram memory 256 (FIGS. 2 and 12).

Figure 12A:
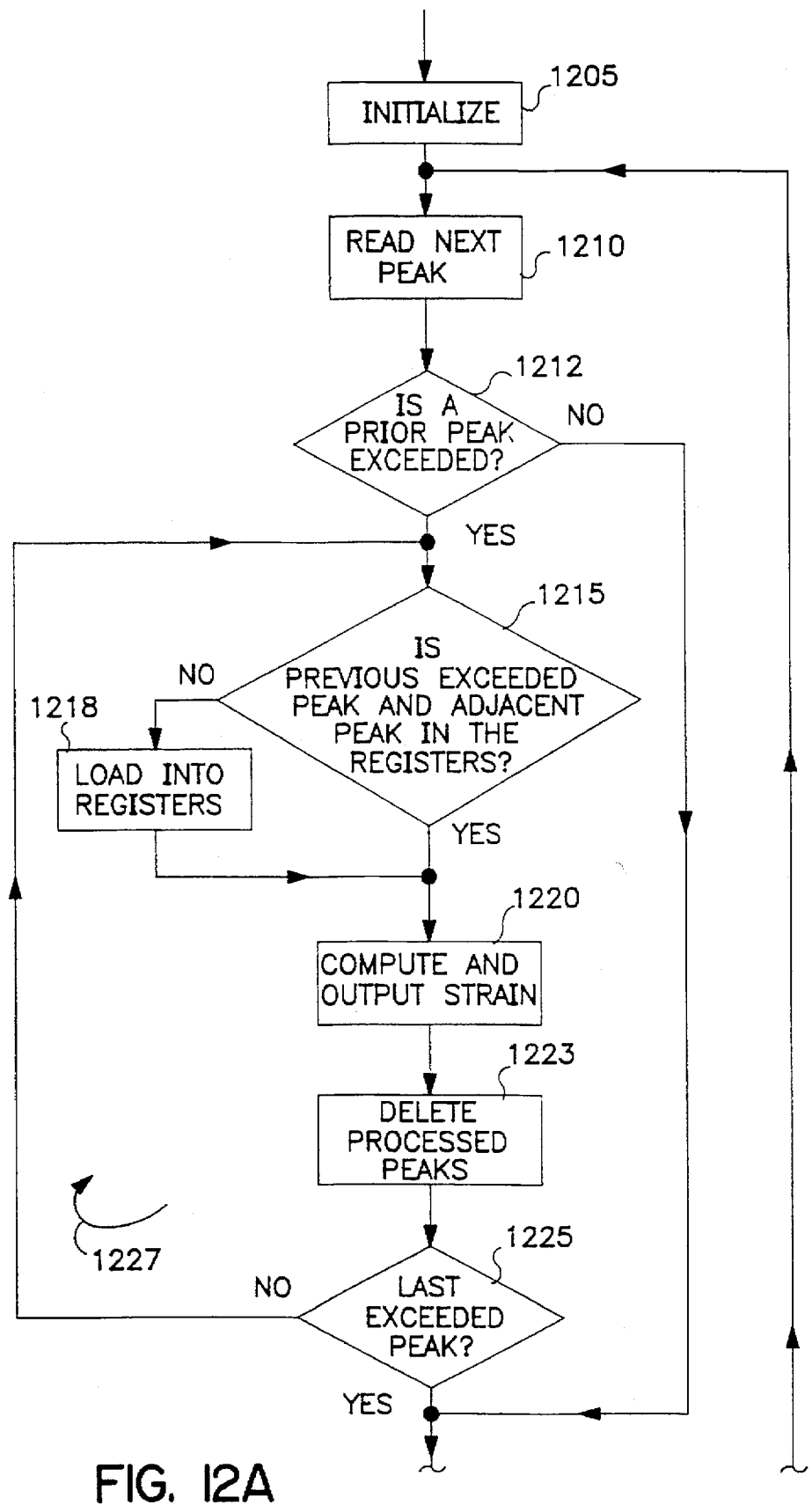
FIG. 12, which includes FIGS. 12A and 12B placed one below another, is a flow diagram of a routine for the processor of the rain flow counter in accordance with an embodiment of the invention.
Figure 12B:
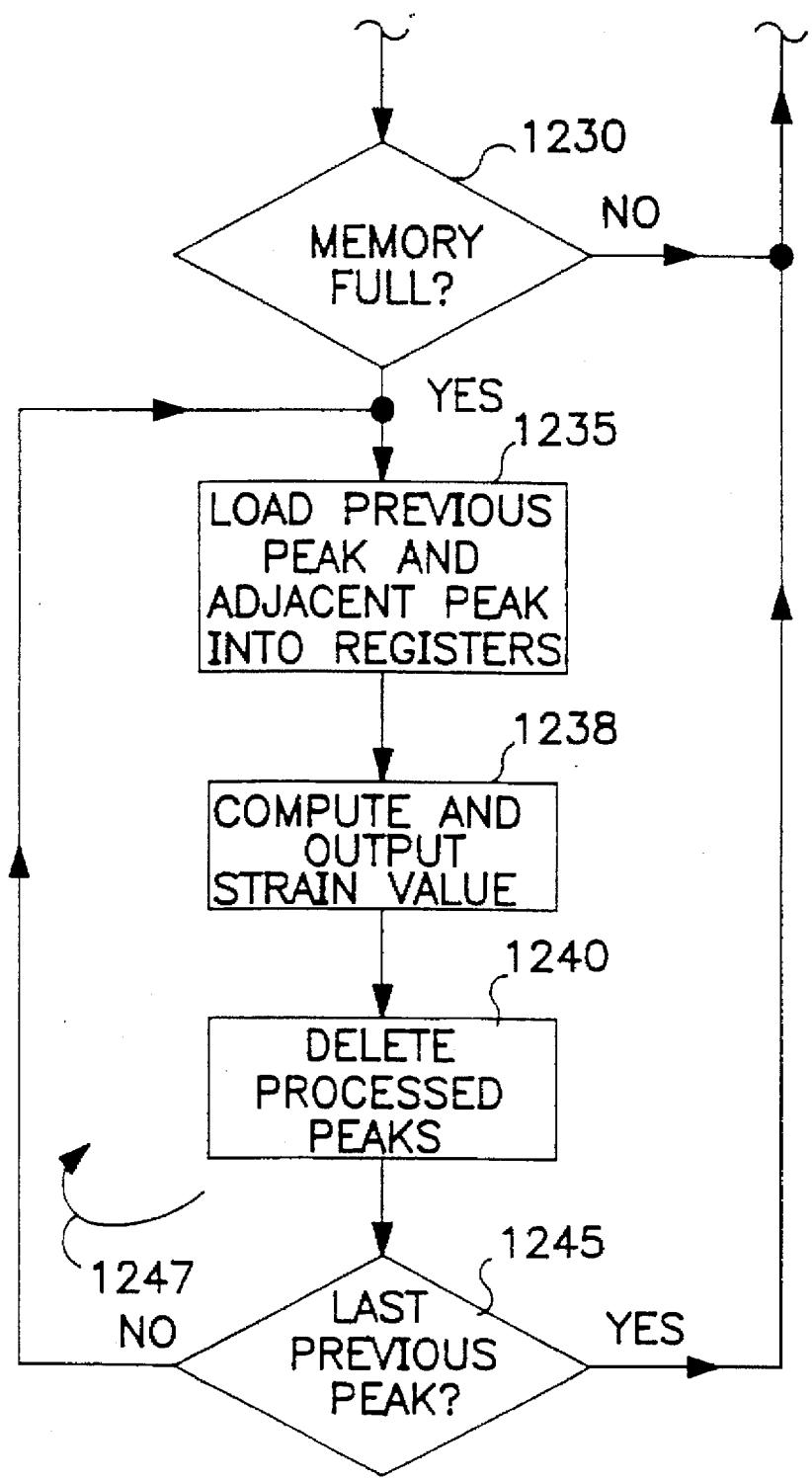

FIG. 12 is a flow diagram of a routine for programming the processor 1150 of the FIG. 11 embodiment to implement rain flow counting that is in accordance with the previously described procedure, and is consistent with counts obtained using known rain flow counting techniques. The block 1205 represents initialization, which can include loading of the first two peaks into the registers 1112 and 1113 if, for example, they have not been previously loaded or have been cleared. [Initialization can subsequently be repeated, as necessary.] The block 1210 represents the reading of the next peak into register 1111 (which moves the previously stored peaks sequentially in the registers). Inquiry is then made (decision diamond 1212) as to whether a prior peak has been exceeded (either in the register sequence, or in memory). If not, the decision diamond 1230 is entered directly. If a peak has been exceeded, however, inquiry is made (decision diamond 1215) as to whether the previous exceeded peak and adjacent peak are in the registers. If so, the block 1220 is entered directly. If not, the exceeded peaks are loaded into the registers (block 1218), before entry to the block 1220. The block 1223 represents the computation of the strain by determination of the difference of the values in the registers, as previously described, and the strain value is output on the line 1150B. As described further hereinbelow, the strain values are represented by a five bit word (32 possible values), so that the measured strain increases, by one, the count in one of the 32 counting registers in the histogram memory 256.

After computation and outputting of the computed strain (block 1220), the processed peaks are deleted (block 1223), and inquiry is made (diamond 1225) as to whether the last exceeded peak has been reached. If not, diamond 1215 is re-entered, and the loop 1227 is continued until all exceeded peaks have been processed. Inquiry is then made (diamond 1230) as to whether the memory 1130 is full (the memory can store a predetermined number of peak values, for example sixteen or thirty-two peak values.) If not, the block 1210 is re-entered, the next peak is read in, and the procedure continues as described. When the memory 1130 is full, the block 1235 is entered, this block representing the loading of a previous peak and adjacent peak into the registers, so that the strain value can be computed and output (as represented by the block 1233), and the processed peaks can be deleted, as before (as represented by the block 1240). Inquiry is then made (diamond 1245) as to whether the last previous peak in the memory 1130 has been processed. If not, the block 1235 is re-entered, and the loop 1247 continues until the inquiry of decision diamond 1245 is answered in the affirmative, whereupon the block 1210 is again re-entered, and the process continues.

Figure 13:
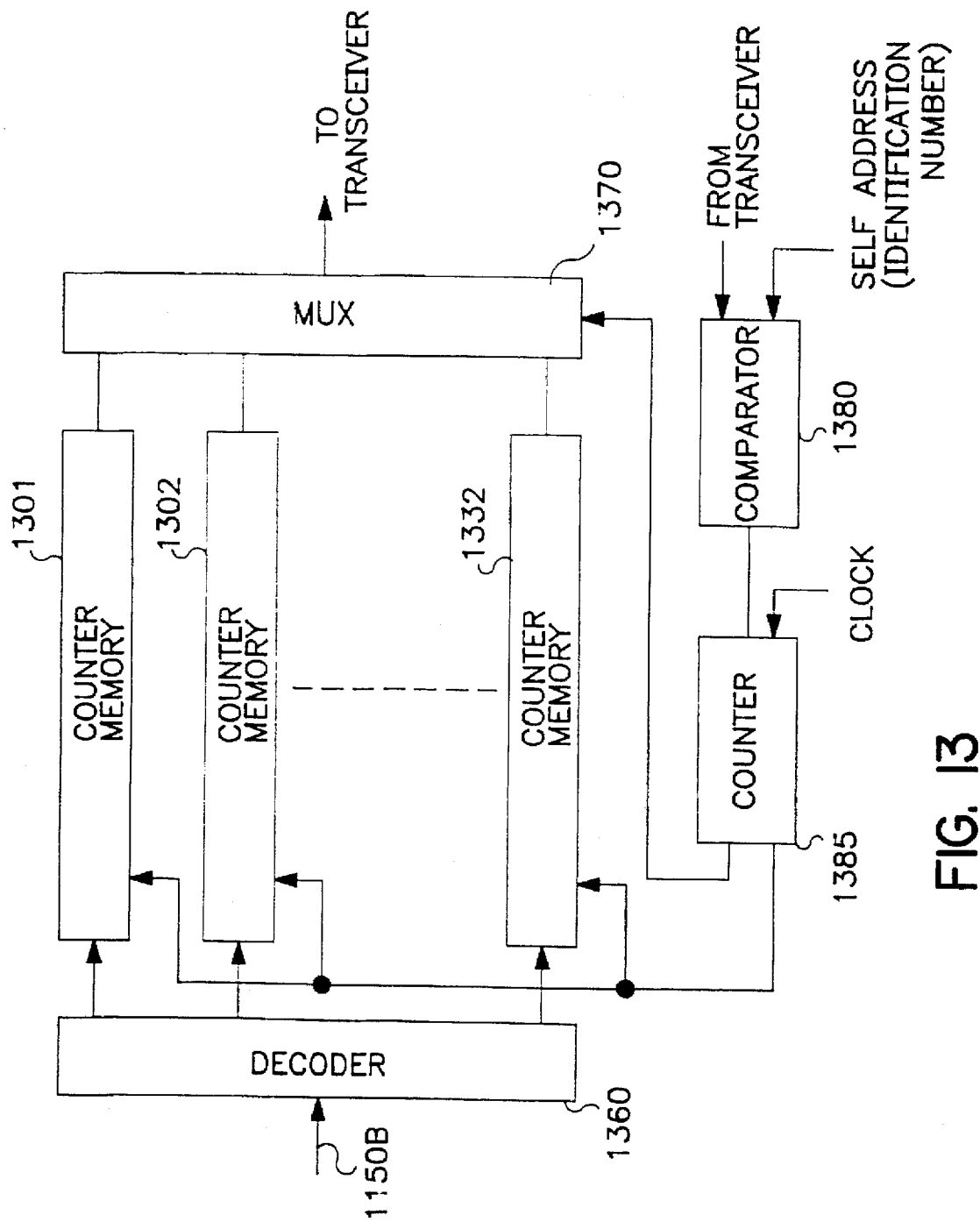
FIG. 13 is a block diagram of the histogram memory circuit in accordance with an embodiment of the invention.

FIG. 13 is a block diagram of the histogram memory circuit 256 of FIG. 2. A decoder 1360 receives the 5 bit signal from the rain flow counter and determines which of 32 counter memories (1301 through 1332) is to be incremented. In the present embodiment, each of the counter memories is a 24 bit counter, which permits counting (without refreshment) over a long period of time, at least a plurality of months, and typically more than one year for conventional operation. A multiplexer 1370 is used to couple the stored counts to the transceiver 270 (FIG. 2) upon interrogation by the local communications subsystem 160 (FIG. 1) or, if desired, after a particular period of time, number of counts, etc. In the present embodiment, a comparator 1380 compares received identification signals from the subsystem 160 with a self-address (identification number) for the particular monitoring unit. When the output of comparator 1380 indicates a match, a counter 1385 is enabled to initiate sequential read-out of the thirty-two accumulated counts in the histogram counter memories.

Figure 14:
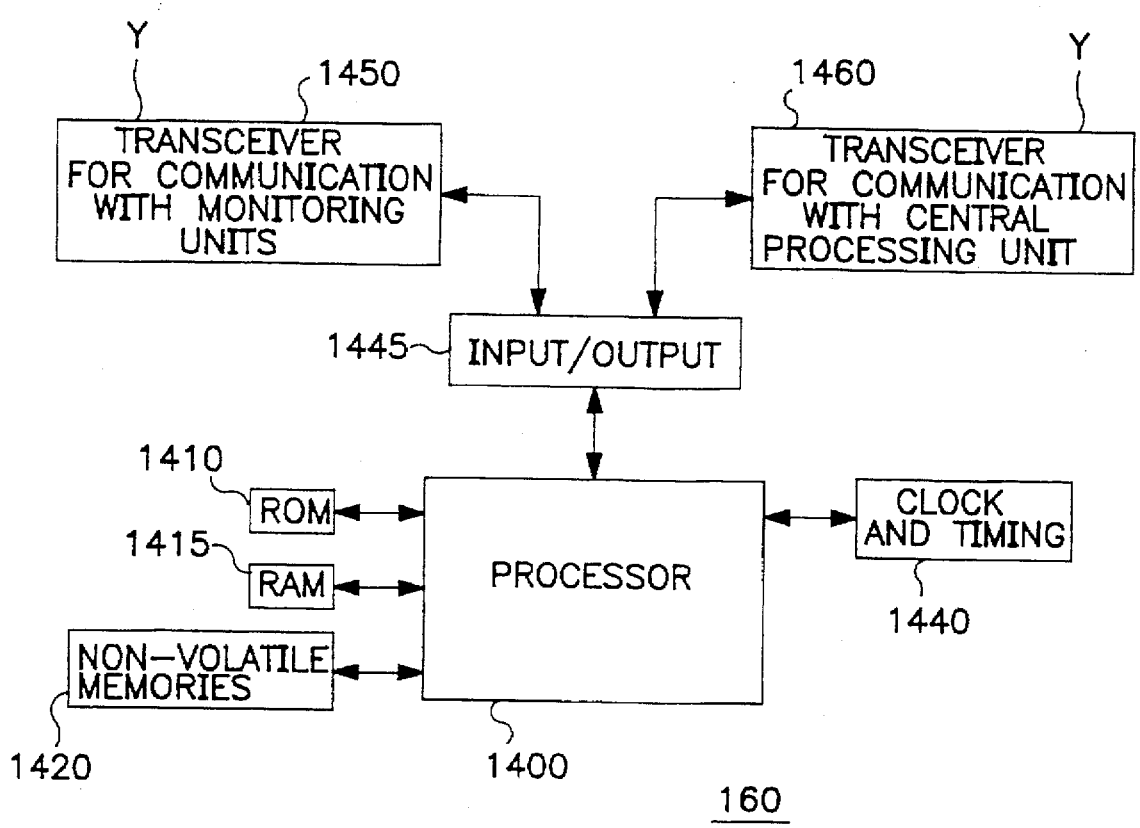
FIG. 14 is a block diagram of the local communications subsystem in accordance with an embodiment of the invention.

Referring to FIG. 14, there is shown a block diagram of the local communications subsystem 160 (FIG. 1) that is located at or near the site (preferably within one mile thereof), and, in the present embodiment, provides two-way wireless communication with the monitoring units 110 and also with the central processing facility 170. The subsystem 160 includes a processor 1400 which may be, for example, any suitably programmed microprocessor having a read-only memory (ROM) 1410 to hold a basic program, random access memory (RAM) 1415 and non-volatile memories 1420, as well as conventional clock and timing circuitry 1440 and an input/output interface 1445. Communicating with the processor 1400 via the input/output interface 1445 are transceivers 1450 and 1460 which may comprise, for example, radio modems. The transceiver 1450 communicates with the monitoring units 110, and the transceiver 1460 communicates with the central processing facility 170. It will be understood that, if desired, a single transceiver could be shared for these purposes. If desired, the subsystem 160 can be provided with a monitor, keyboard, and/or other peripherals (not shown) for local control and/or monitoring, and could also be provided with programs to implement computations that are indicated herein as being made at the central processing facility (e.g. fatigue life computations).

Figure 15:
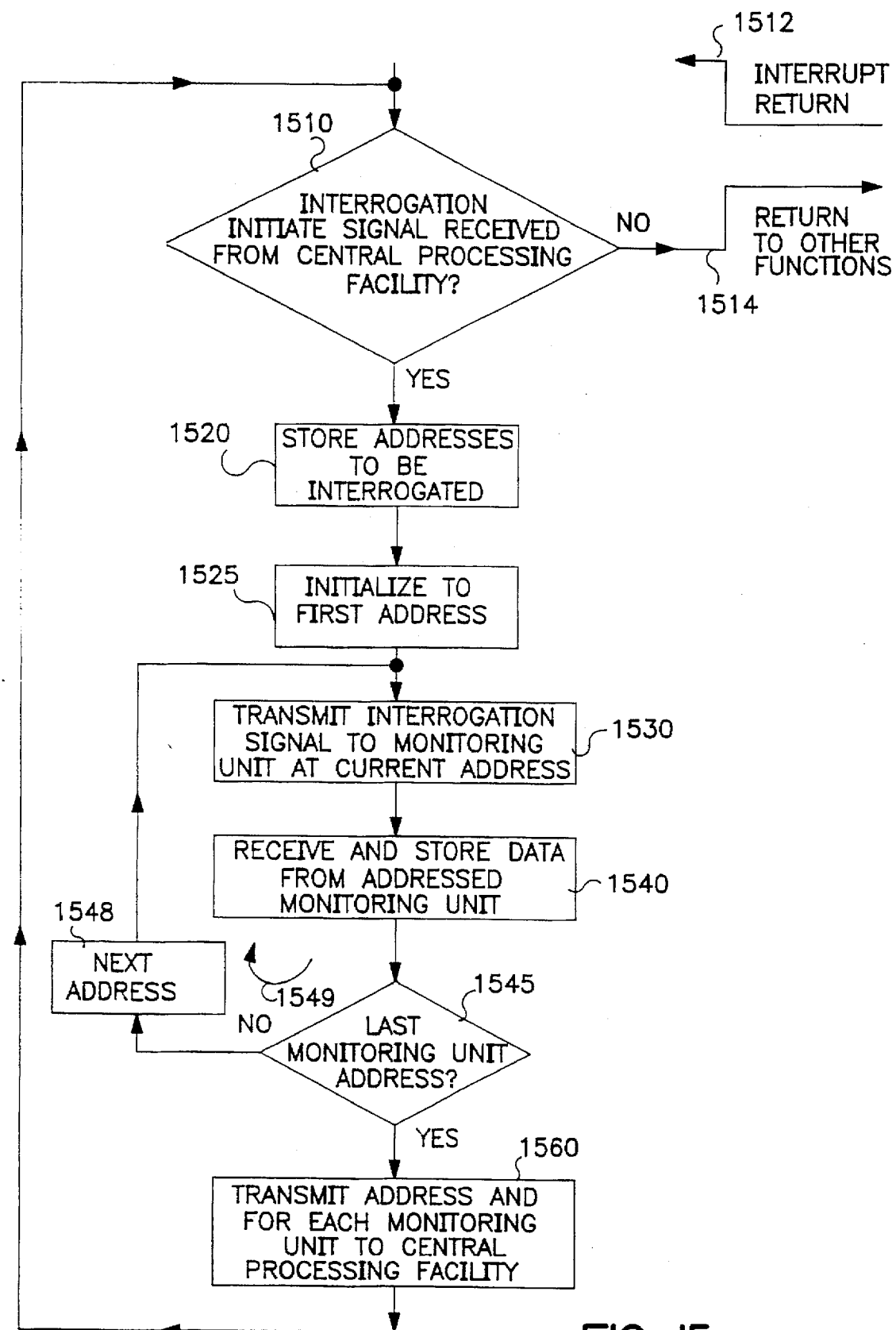
FIG. 15 is a flow diagram for controlling the processor of the local communications subsystem in accordance with an embodiment of the invention.

FIG. 15 is a flow diagram of a routine for programming the processor 1400 of the local communications subsystem 160 in accordance with an embodiment of the invention. The diamond 1510 and the interrupt and return arrows 1512 and 1514, respectively, represent the waiting for an interrogation initiate signal from the central processing facility. In particular, in the present embodiment the subsystem 160 operates to interrogate the sensing units 110 upon command from the central processing facility 170 (FIG. 1), although it will be understood that interrogation could be on other bases as well, for example, periodic interrogation, local operator-controlled interrogation, closed-loop interrogation based on received measurements, etc. When the inquiry of decision diamond 1510 is in the negative, an interrupt function can be used to return the processor to other functions (if any), with an interrupt return signal 1512 being implemented as soon as an initiate signal is received by the transceiver 1460 of the subsystem 160. When the inquiry of decision diamond 1510 is answered in the affirmative, the block 1520 is entered, this block representing the storing of the addresses (i.e., identification numbers) of the monitoring units that are to be interrogated. In the present embodiment, these addresses are received from the central processing facility. However, again, it will be understood that alternative techniques can be used, such as interrogation of all monitoring units, any predetermined or dynamically determined sequence of interrogation, etc. The block 1525 represents initializing a pointer to the first stored address. An interrogation signal is then transmitted to the monitoring unit at the current address, as represented by the block 1530. [All monitoring units will receive the interrogation signal, but only the one whose address (identification number) corresponds to the transmitted address will respond.] The transceiver 1450 of the subsystem 160 then receives and stores the data from the current monitoring unit, as represented by the block 1540. Inquiry is then made (diamond 1545) as to whether the last monitoring unit address has been reached. If not, the address is incremented (block 1548), the block 1530 is re-entered, and the loop 1549 is continued until all the monitoring units with the specified addresses have been interrogated. The block 1560 is then entered, this block representing the transmitting of the data by the transceiver 1460 of local communications subsystem 160 to the central processing facility 170. Each string of data from a particular monitoring unit is sent with the address (or identification number) of the monitoring unit. It will be understood that the communication between the local communications subsystem and the central processing facility can be of a routine nature, with initialization, data, and address information being sent by conventional type communication by wire or wireless means. At the central processing facility, remaining fatigue life or other computations can be made, as described above. Typically, although not necessarily, the local communications subsystem will be located where there is a source of power, or the local communication subsystem can be provided with relatively powerful battery power without undue inconvenience. After implementation of the function of the block 1560 of FIG. 15, the diamond 1510 is re-entered, and the next interrogation initiate signal is awaited.

The invention has been described with reference to a particular preferred embodiment, but variations within the spirit and scope of the invention will occur to those skilled in the art. For example, it will be understood that other types of transducers could be used in conjunction with the monitoring units to measure physical parameters such as acoustic response, pressure, temperature, etc. Also, while the invention is particularly applicable to large structures such as bridges or buildings, it can be employed on various other structures, examples being vehicles or aircraft.

We claim:

1. A system for monitoring strain on a structure, comprising:

a plurality of battery powered wireless monitoring units adapted for attachment to the structure, each of said units including: a sensing transducer for producing signals representative of strain, processing circuitry for processing strain-representative signals, said processing circuitry including a rain flow counter means and means for storing, as processed signals, accumulated rain flow counts of predetermined magnitudes, and means for wireless transmitting of the processed signals; and receiving means for receiving the transmitted processed signals.

2. The system as defined by claim 1, wherein each of said monitoring units comprises a semiconductor chip that contains said processing circuitry, said storing means, and said transmitting means.

3. The system as defined by claim 1, further comprising a processing facility located remotely from the site of said structure, and wherein said receiving means comprises a local communications subsystem located in the region of the site of said structure, said local communications subsystem including means for transmitting the processed signals to the processing facility.

4. The system as defined by claim 2, further comprising a processing facility located remotely from the site of said structure, and wherein said receiving means comprises a local communications subsystem located in the region of the site of said structure, said local communications subsystem including means for transmitting the processed signals to the processing facility.

5. The system as defined by claim 4, wherein said local communications subsystem is located within one mile of the site of said structure, and wherein said processing facility is located at least a plurality of miles from the site.

6. The system as defined by claim 1, wherein the transmitting means of said monitoring units comprises a transceiver, and wherein said receiving means comprises a transceiver, and wherein said receiving means includes means for transmitting interrogation signals to said monitoring units, and said monitoring units include means responsive to interrogation signals for transmitting said processed signals to said receiving means.

7. The system as defined by claim 2, wherein the transmitting means of said monitoring units comprises a transceiver, and wherein said receiving means comprises a transceiver, and wherein said receiving means includes means for transmitting interrogation signals to said monitoring units, and said monitoring units include means responsive to interrogation signals for transmitting said processed signals to said receiving means.

8. The system as defined by claim 3, wherein said local communications subsystem includes means for transmitting interrogation signals to said monitoring units, and said monitoring units include means responsive to interrogation signals for transmitting said processed signals to said receiving means.

9. The system as defined by claim 4, wherein said local communications subsystem includes means for transmitting interrogation signals to said monitoring units, and said monitoring units include means responsive to interrogation signals for transmitting said processed signals to said receiving means.

* * * * *